United States Patent [19]

Rosenthal

[11] Patent Number: 5,051,615
[45] Date of Patent: Sep. 24, 1991

[54] MONOLITHIC RESISTOR COMPARATOR CIRCUIT

[75] Inventor: Bruce D. Rosenthal, Los Gatos, Calif.

[73] Assignee: Teledyne Industries, Mountain View, Calif.

[21] Appl. No.: 382,847

[22] Filed: Jul. 20, 1989

[51] Int. Cl.[5] .......................... H03K 5/24; G01K 7/16
[52] U.S. Cl. ...................................... 307/350; 307/310; 307/355; 307/360; 307/362; 374/170; 374/183
[58] Field of Search ............... 307/310, 354, 355, 360, 307/362, 350; 374/170, 173, 183, 185

[56] References Cited

U.S. PATENT DOCUMENTS

| | | | |
|---|---|---|---|
| 3,809,929 | 5/1974 | Vittoz | 307/310 |
| 4,556,330 | 12/1985 | Regtien | 307/310 |
| 4,650,347 | 3/1987 | Shigemura et al. | 307/310 |

FOREIGN PATENT DOCUMENTS 0110929  7/1982  Japan ..................... 307/310

Primary Examiner—John Zazworsky
Attorney, Agent, or Firm—Fliesler, Dubb, Meyer & Lovejoy

[57] ABSTRACT

A precision resistor comparator provides for the comparison and the resistive value of a first resistor with the predetermined resistive value of a second resistor. A differential comparator and level shifter provides a digital signal indicative of the relative magnitude of the first and second resistors. Another aspect of the present invention is the provision of the second resistor on a monolithic substrate with the resistor comparator circuit. The second resistor is provided with a temperature coefficient that is substantially independent of variances in its fabrication parameters and a resistance that can be trimmed, following fabrication, with substantially no effect on the temperature coefficient of the second resistor.

13 Claims, 3 Drawing Sheets

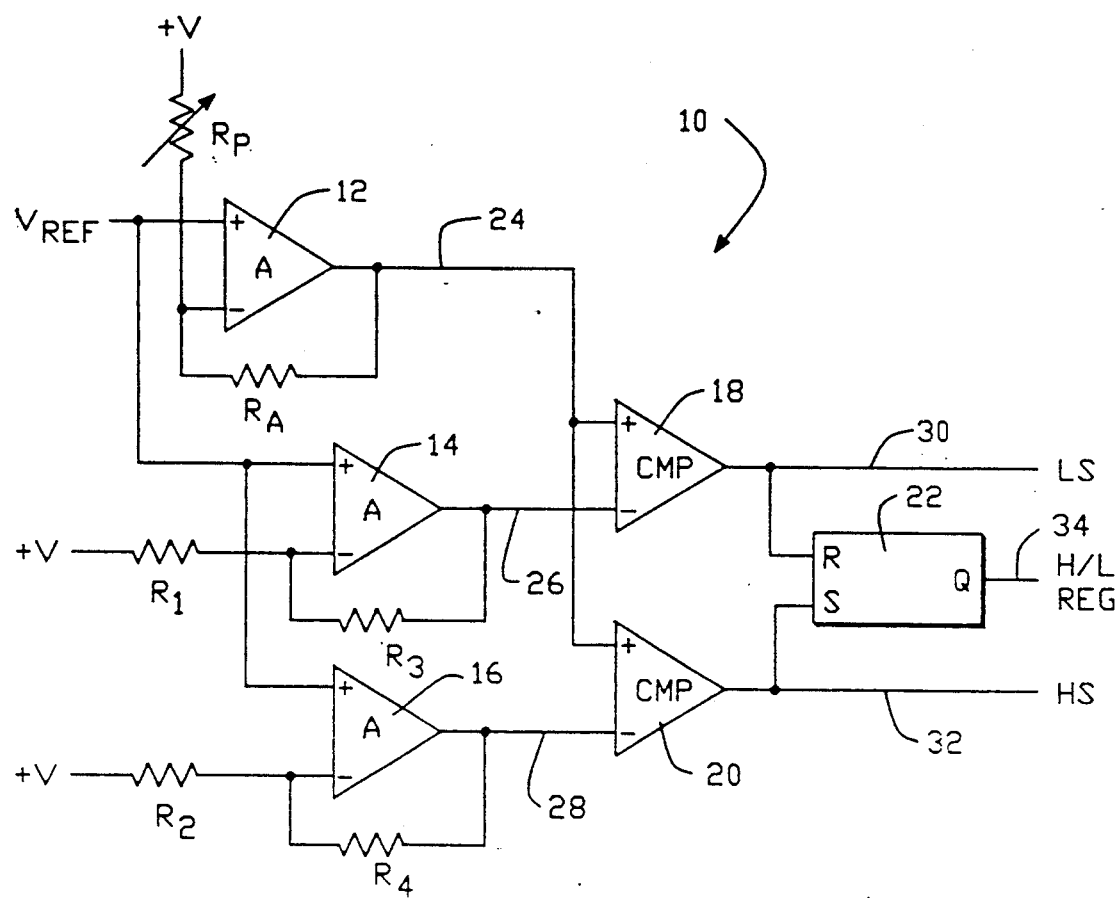
FIG.—1
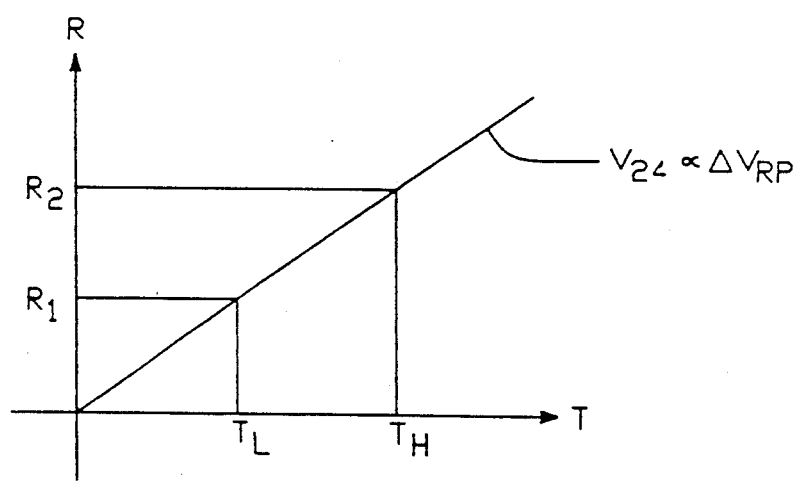
FIG.—2

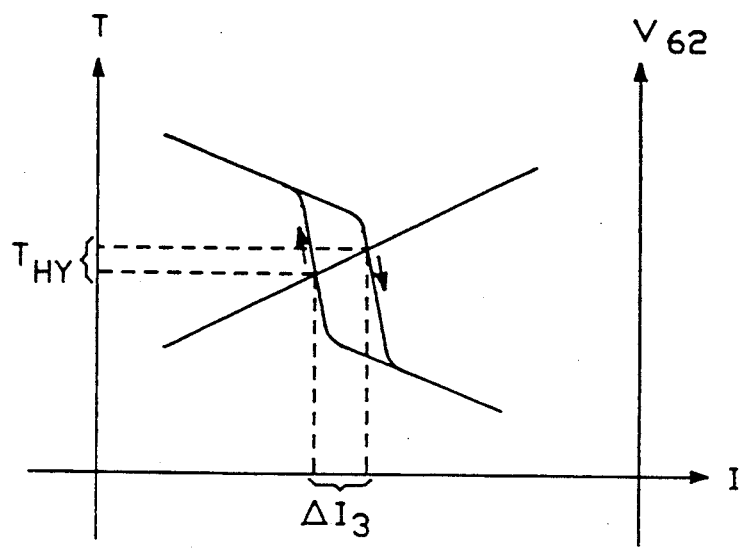
FIG.—4
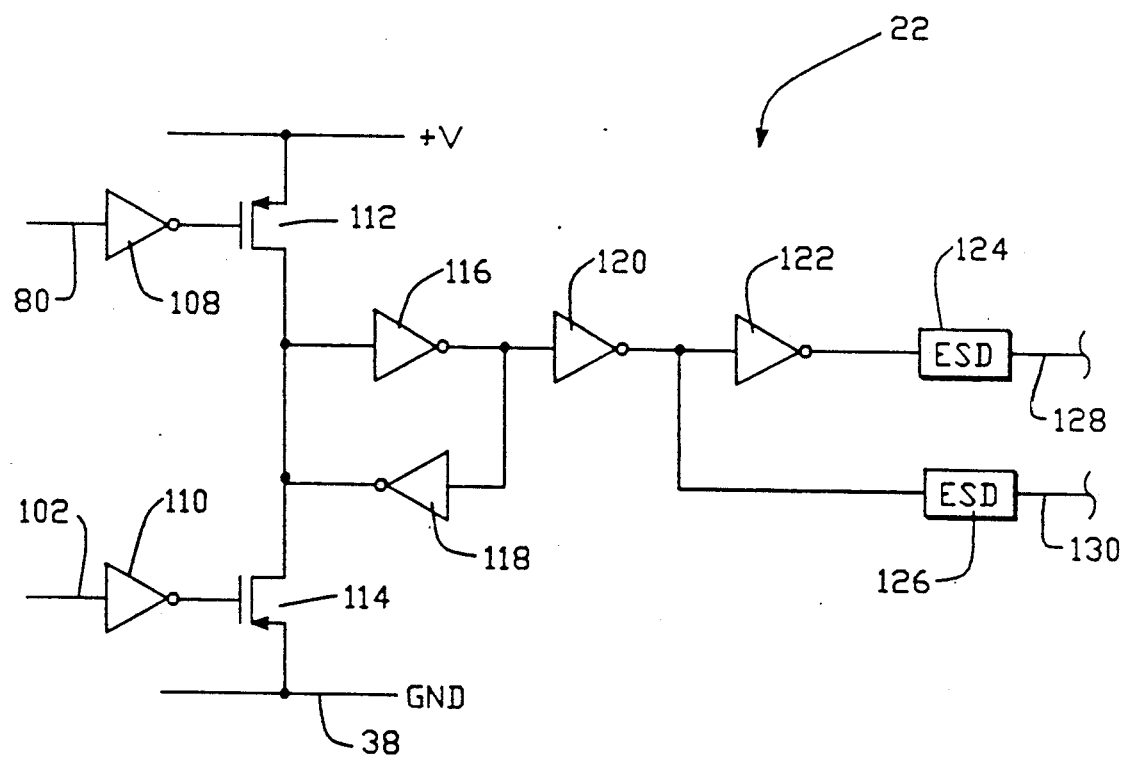
FIG.—5

MONOLITHIC RESISTOR COMPARATOR CIRCUIT

FIELD OF THE INVENTION

The present invention is generally related to circuits for determining temperature threshold by comparison of a reference value to a variable value including a value produced by a temperature dependent element, and, in particular, to a monolithic circuit implementing a precision resistor comparator circuit and including an on-chip temperature dependent resistor as an optional comparison resistance element.

BACKGROUND OF THE INVENTION

There is often a need to determine whether an ambient, enclosed cavity or component body temperature has crossed a predetermined temperature threshold. Numerous electrical circuits variously utilizing electromechanical and discrete temperature sensitive components, including bi-metallic strips and thermistors, have been developed to meet this need. While such solutions are conventionally utilized, they are not the best possible solution. Rather, such solutions are utilized at the cost of having to redesign the sensing circuit with each application. The detracting consequences, therefore, include repeated circuit design efforts and the corresponding product development complexity, the fact that the circuits must often involve mechanical and electromechanical design and implementation considerations, and the number of components and printed circuit board area consumed to realize the necessary circuit.

An entirely electronic circuit, and one that could be substantially implemented as a single monolithic integrated circuit would therefore be desirable. There are, however, a number of significant problems to achieving this goal. Conventional thermistors are often used to provide a temperature dependent voltage. Although well-characterized, both in operation and in manufacture, they are not suitable for monolithic fabrication due to their size, construction composition and sensitivity to production process variations.

Other temperature dependent elements more appropriate for monolithic fabrication are known to exist. For example, the base to emitter voltage drop of a bipolar transistor at a fixed current flow is known to vary directly with the temperature. The nominal voltage drop, $V_{BE}$, however, is highly dependent on the parameters of its fabrication process even as between ostensibly identical fabrication runs.

Further, once fabricated, there is no practical manner of trimming the resultant $V_{BE}$ value so as to achieve a standardized circuit behavior. Finally, the total change in the voltage $V_{BE}$ over even a full range of temperatures, such as from 25° to 175° Centigrade is quite small. Therefore, the circuit required to support the bipolar transistor temperature sensor must itself be insensitive to temperature while being quite sensitive to the $V_{BE}$ voltage changes in order to yield an acceptable operating tolerance.

SUMMARY OF THE INVENTION

A general purpose of the present invention is to provide a resistor comparator circuit suitable for monolithic fabrication inclusive of a temperature dependent element to provide for the discrimination of one or more temperature thresholds.

This is achieved in the present invention by provision of a precision resistor comparator for comparing the resistive value of a first resistor with the predetermined resistive value of a second resistor. A differential comparator and level shifter provides a digital signal indicative of the relative magnitude of the first and second resistors. Another aspect of the present invention is the provision of the second resistor on a monolithic substrate with the resistor comparator circuit. The second resistor is provided with a temperature coefficient that is substantially independent of variances in its fabrication parameters and a resistance that can be trimmed, following fabrication, with substantially no effect on the temperature coefficient of the second resistor.

Thus, an advantage of the present invention is that it provides for a fully monolithic resistor comparator.

Another advantage of the present invention is that it provides for a completely self-contained monolithic circuit, other than for threshold setting external resistances, for implementing a solid state temperature threshold discriminator and, in preferred embodiments, a single integrated circuit electronic thermostat having a precision generally equal to or greater than that of comparable mechanical, electromechanical and discrete electronic circuits.

Yet another advantage of the present invention is that the integrated resistor comparator threshold discriminating sub-circuit may be repeatedly paralleled to discriminate multiple temperature thresholds.

A still further advantage of the present invention is the allowance for the use of an off-chip temperature responsive element to support remote sensing of thermal changes, or in a resistor comparator preferred embodiment of the present invention, to function as a reference resistance.

BRIEF DESCRIPTION OF THE DRAWINGS

These and other attendant advantages and feature of the present invention will become apparent and readily appreciated upon reference to the following detailed description of the invention when considered in conjunction with the drawings, wherein like reference numerals indicate like parts, and wherein:

FIG. 1 is a schematic diagram of the high-level functional implementation of the present invention;

FIG. 2 is a graphical representation of the correlation between threshold resistors and output values of the circuit of FIG. 1;

FIG. 4 presents a graphical representation of the relationship between temperature and temperature threshold state discrimination; and FIG. 5 is a detailed schematic diagram of the output latch portion of a preferred embodiment of the present invention.

DETAILED DESCRIPTION OF THE INVENTION

Figure 3:
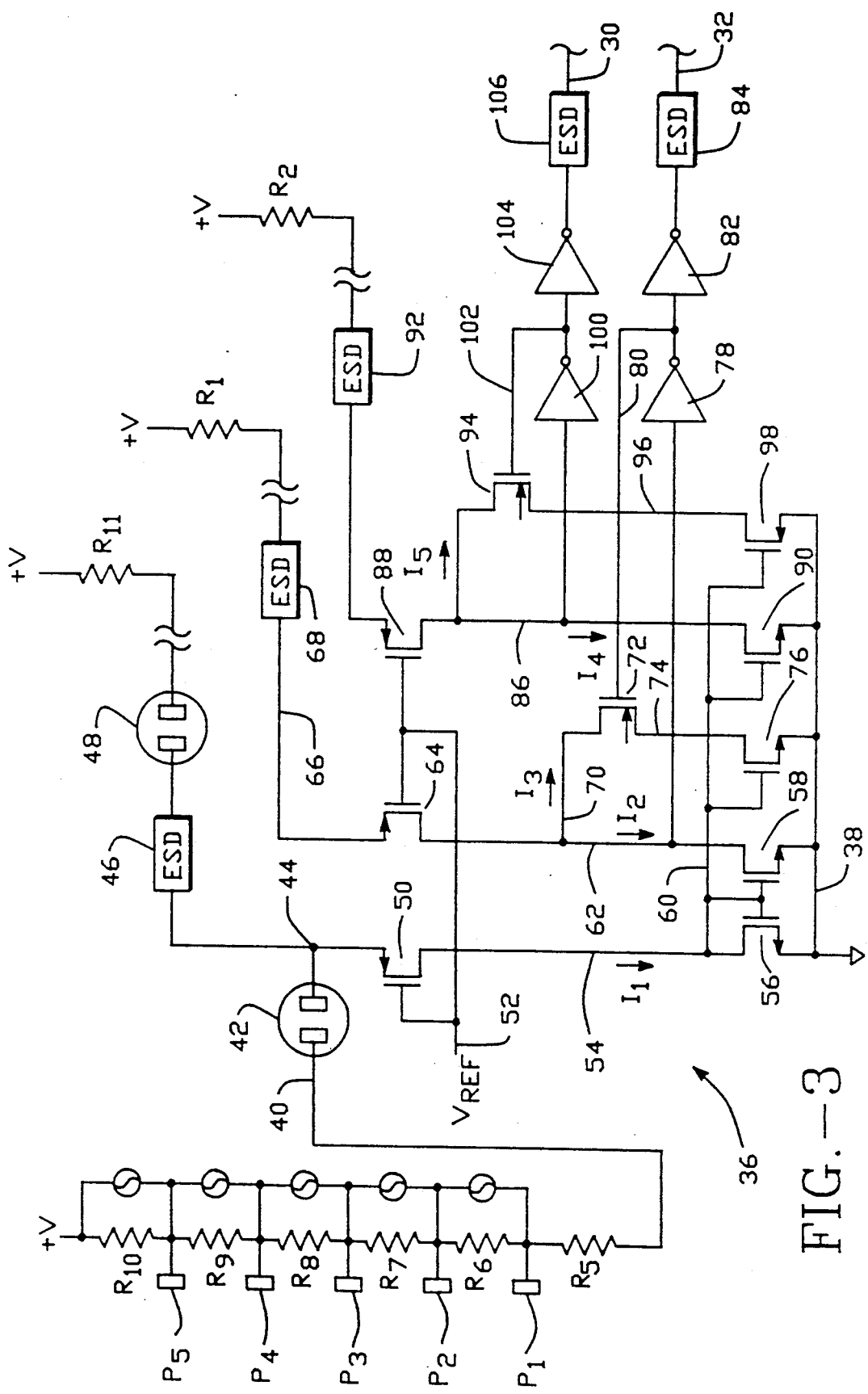
FIG. 3 is a detailed schematic diagram of a preferred embodiment of the present invention.

While the present invention, consistent with its broader aspects, may be utilized as a generalized resistor comparator or as a temperature-based logic element, it is described below with regard to its best mode: a multiple setpoint, single chip fully electronic thermostat.

The circuit 10 of FIG. 1 represents a high-level implementation of the preferred embodiment of the present invention. The circuit 10 includes an operational amplifier 12 for producing a temperature representative voltage on its output line 24. The nominal magnitude of this voltage is dependent on a temperature independent reference voltage, $V_{REF}$, and the ratio of the resistors, $R_P$ and $R_A$. The temperature coefficient of $R_A$ is chosen to be on the order of 0.1 percent per degree Centigrade or less; i.e., the value of resistor $R_A$ is substantially independent of temperature. However, the temperature coefficient of the resistor $R_P$ is specifically chosen to be greater than about 0.1 percent per degree Centigrade. The temperature coefficients of $R_A$ and $R_P$ are further chosen to have a difference of at least approximately 0.2 percent per degree Centigrade, and preferably 0.5 percent per degree Centigrade. Thus, the output voltage on the line 24 will vary substantially with temperature. A pair of operational amplifiers 14 and 16 also receive the reference voltage $V_{REF}$. The output voltage on line 26 from amplifier 14 is then further dependent on the ratio of the resistors $R_1$ and $R_3$. Both $R_1$ and $R_3$ are also chosen to have a small or minimum temperature coefficient. The amplifier 16 provides a separate voltage on its output line 28 based in part on the resistor ratio defined by resistors $R_2$ and $R_4$. These resistors also have a minimum temperature coefficient.

Voltage comparators 18, 20 both receive the temperature dependent output voltage of amplifier 12 as an input from line 24. As a second input, the comparators 18, 20 receive the voltages provided on lines 26, 28, respectively. The comparators 18, 20, in turn, provide respective digital outputs on the output lines 30, 32. A reset/set (R-S) type latch 22 provides a single output on line 34 indicative of the mutual logic states of the comparator outputs on lines 30, 32.

Referring to FIG. 2, the discrimination of temperature thresholds is shown as a function of the resistance values of resistors $R_1$ and $R_2$. The voltage on line 24 will vary in proportion to the voltage drop across the resistor $R_P$. The resistance $R_2$ represents a greater resistance than $R_1$. Therefore, $R_1$ will establish a low temperature threshold, $T_L$, while $R_2$ will establish a high temperature threshold, $T_H$.

Referring again to FIG. 1, as the temperature dependent voltage on line 24 increases to a level greater than that on amplifier output line 26, corresponding to a temperature crossing $T_L$, a low set (LS) signal on the comparator output line 30 switches from a logic 0 to a logic 1 state. The LS signal is applied to the reset input (R) of the latch 22 with the result that the output signal (Q) provided on the high/low regulator (HR REG) output line 34 is forced to a logic 0 state.

As the temperature dependent voltage on line 24 increases past the amplifier output voltage provided on line 28, the voltage comparator 20 switches from providing a logic 0 to a logic 1 signal on the high set (HS) line 32. The high set signal is provided to the set (S) input of the latch 22 with the result that the high/low regulator output signal switches to a logic 1 state. The latch 22 will remain in this state until the temperature dependent voltage on line 24 again drops below the voltage level on the amplifier output line 26, whereupon the output signal of the latch 22 will be reset to a logic 0 state. Thus, the latch 22 is effective in implementing a large scale ($T_H$ to $T_L$) hysteresis function by its output signal on line 34.

Referring now to FIG. 3, a detailed integrated circuit schematic of the preferred embodiment of the present invention is shown. The circuit, generally indicated by the reference numeral 36, relies on a temperature dependent resistive element to produce a corresponding temperature dependent current $I_1$. This temperature dependent element may be provided either internally or externally with respect to the monolithically fabricated circuit 36, depending on the specific preferred embodiment of the present invention. An internal temperature dependent element is formed by a chain of series connected resistors $R_{5-10}$. These resistors are preferably fabricated on a monolithic substrate 140 along with the circuit 36 using a lightly doped P diffusion having a 2.3 K ohms per square resistance at 25° Centigrade ±0.6%. Such a P− integrated resistor will have a positive temperature coefficient on the order of 0.6 percent per degree Centigrade. The resistivity of the P− integrated resistor may change by as much as ±10% between otherwise identical monolithic fabrication runs producing the integrated circuit 36 due to subtle process variations. However, the temperature coefficient of the resistors $R_{5-10}$ will remain essentially constant over the range of process variation. Consequently, in accordance with the preferred embodiments of the present invention, only the resistance value of the integrated resistors $R_{5-10}$ need be trimmed following fabrication to realize expected operation independent of the specific resistive values for the resistors $R_1$ and $R_2$. That is, trimming the resistance of resistors $R_{5-10}$ to a predetermined value will leave the resistance values of the resistors $R_1$ and $R_2$ as the only variables needed to select precise temperature thresholds.

The P− integrated resistors $R_{5-10}$ are preferably fabricated in a conventional CMOS process using a boron impurity provided at an implant energy of 175 KeV to realize a doping density of $10^{16}/cm^3$ in a silicon layer having a background doping density of $10^{15}/cm^3$ using a phosphorous impurity. Increasing the implant doping level to as much as $10^{18}/cm^3$ will reduce the temperature coefficient of the P− integrated resistor to as low as 0.05 percent per degree Centigrade; a value still sufficient for purposes of the present invention. Thus while an acceptable temperature coefficient range of 5 percent per degree Centigrade to 0.05 percent per degree Centigrade may be employed, the preferred range is 0.1 percent to 1 percent per degree Centigrade. Within this preferred range, the variance in temperature coefficient is less than 1%. In the preferred embodiments of the present invention, each of the P− integrated resistors $P_{5-10}$ are delimited along a continuous diffusion region by contact pads $P_{1-5}$ that contact the body of the resistive diffusion region and thereby define specific resistance values. The preferred sequence of resistance values is set forth in Table 1 below.

TABLE 1

| Resistor | Resistance |
|---|---|
| $R_5$ | 92KΩ |
| $R_6$ | 8KΩ |
| $R_7$ | 4KΩ |
| $R_8$ | 2KΩ |
| $R_9$ | 1KΩ |
| $R_{10}$ | 0.5KΩ |

The resistor $R_5$ provides a base resistance value while resistors $R_{6-10}$ permit a binary weighted trim resistance to be chosen. The choice in the preferred embodiments is to achieve a final resistance value of 100KΩ. Accordingly, a conventional, normally conductive integrated circuit fuse is placed in parallel with each of the resistors R$_{6-10}$. The fuses may be programmed by application of a sufficient voltage between adjacent pads P$_{1-5}$ to open circuit the corresponding fuse and thereby trim the total series resistance of the P$^-$ integrated resistor R$_{5-10}$.

The base resistor R$_5$ is coupled via trace 40 through a bonding option pad 42 and then to a node 44 at the source of an FET transistor 50. The bonding option pad 42 is provided in the preferred embodiments of the present invention to allow post-fabrication selection of whether to use the internal temperature dependent resistor R$_{5-10}$ or an externally attached resistor R$_{11}$. This external resistor R$_{11}$ is preferably a conventional thermistor or equivalent element connected to a connector pin of the packaged integrated circuit 36. That is, the present invention is preferably packaged in a conventional plastic dual inline (DIP) integrated circuit package. Internally, this connector pin is conductively coupled through another bonding option pad 48 and an electrostatic discharge (ESD) circuit 46 to the drain node 44 of the FET 50. The ESD circuit 46 may be of a conventional design, suitable to limit the voltage and current levels passed through the resistor R$_{11}$ to the node 44 to avoid damage to the circuit 36. In the preferred embodiment of the present invention, the ESD circuit 46 is constructed in accordance with the circuit disclosed in the copendant U.S. Pat. No. 4,922,371 entitled "ESD Protection Circuit for MOS Integrated Circuits" issued May 1, 1990 and assigned to the assignee of the present application. The teachings of this co-pendant patent are expressly incorporated herein by reference.

The internal or external temperature dependent resistance is chosen by providing a conductive bridge across either of the bonding option pads 42, 48. The terminal end of the resistor R$_{5-10}$ or resistor R$_{11}$ is coupled to a +V voltage rail, preferably at 5 volts DC. With a reference volta V$_{REF}$ applied to the gate 52 of the FET 50, a current I$_1$ will flow through conductor 54 as indicated in FIG. 3 and through a second FET 56 to the ground node 38. The source of the V$_{REF}$ voltage may be any conventional integrated voltage reference. In the preferred embodiments of the present inventions, this V$_{REF}$ source is constructed as shown in the U.S. Pat. No. 4,769,589, issued Sept. 6, 1988, titled "Low Voltage Temperature Compensated Constant Current Source."

Another FET 58 is coupled to the FET 56 to form a current mirror whereby a current I$_2$, proportional in magnitude to the current I$_1$, is forced to flow through the conductor 62. The source of the current I$_2$ is through an external resistor R$_1$ connected between the +V voltage rail and another connector pin of the packaged integrated circuit 36. The resistor R$_1$ is conductively coupled, internal to the circuit 36, through another ESD circuit 68, to a conductive trace 66 and through an FET 64 to the conductive trace 62. The gate of the FET 64 is connected in common with the gate of FET 50 to the reference voltage V$_{REF}$. Consequently, the voltage on the conductive traces 54 and 62 are constrained between the voltage potential of the reference voltage V$_{REF}$ and ground.

The voltage potential on the conductive trace 62 is provided as an input to an invertor 78. The output of the invertor 78 is coupled through a second invertor 82 and an ESD circuit 84 to a conductive trace 32 ultimately connected to an external connector pin of the integrated circuit 36. The output of the invertor 78 is also provided via a conductive trace 80 to the gate of a P-type FET 72. Thus, a conductive path for a current I$_3$ is selectively enabled, dependent on the output state of the invertor 78, via a conductive trace 70 connected to the conductive trace 62 at one end and through FETs 72 and 76 to the ground trace 38. The gate of the FET 76 is also connected to the gates of the mirror FETs 56 and 58. The current I$_3$ is therefore also proportional to the current I$_1$, though not necessarily equal to the current I$_2$. Rather, the relative channel dimensions of the FETs 58 and 76 with respect to those of FET 56 independently determine the magnitudes of the currents I$_2$ and I$_3$ relative to I$_1$. Thus:

$$I_1 = k_1(I_2), \quad \text{Equ. 1}$$

and $$I_1 = k_2(I_3), \quad \text{Equ. 2}$$

where k$_1$ and k$_2$ are constants defined by the relative channel dimensions of the fabricated transistors.

Since the reference voltage V$_{REF}$ effectively establishes a fixed voltage potential at the node 44, the magnitude of the current I$_1$ is effectively determined by the resistance of the resistors R$_{5-10}$ or R$_{11}$. As the resistance of either of these resistors varies with temperature, the magnitude of the current I$_1$ likewise changes. The resistance of the resistor R$_1$ does not change with temperature. Therefore, the effective resistance of the FET 64 must vary to maintain the relationship defined by Equation 1 and Equation 2. The conduction of the current, I$_3$, however, is dependent on the state of the invertor 78 which is, in turn, dependent on the voltage potential of the conductive trace 62. Therefore, the conduction or non-conduction of the current I$_3$ in the operation of the integrated circuit 36 introduces hysteresis in the switching of the output state of the invertor 78 and at the external package pin connected by the conductive trace 32.

Referring now to FIG. 4, the hysteresis loop engendered by the switchable conductance of the current I$_3$ is illustrated graphically. Assuming a low initial temperature, the voltage on conductive trace 62 will be sufficiently high to force the output state of the invertor 78 to a low logic state with the consequence that the FET 72 is off. As the temperature increases, the magnitude of the currents I$_1$ and I$_2$ increase. The voltage on the conductive trace 62 drops linearly until crossing the logic 0 threshold at the input of the invertor 78. The output of the invertor 78 switches to a logical 1 state turning on the FET 72 and drawing the current I$_3$. With the additional current required, the effective resistance of the FET 64, and voltage on the trace 62, drops precipitously sufficient to allow for conduction of the additional current I$_3$. Any further increase in temperature results in a renewed linear decrease in voltage on the trace 62.

As temperature decreases from a high level, the voltage on the conductive trace 62 begins to linearly increase. Since the FET 64 must conduct the combined current I$_2$+I$_3$, the temperature must drop, and the current I$_1$ also drop, sufficient for the voltage on the conductive trace 62 to rise to the logic 1 input threshold level of the invertor 78. Then the output state of the invertor 78 switches to a logic 0 turning off the FET 72. The current load through the FET 64 is suddenly reduced and the voltage on the conductive trace 62 rapidly increases. Accordingly, a hysteresis loop is functionally created with a hysteresis temperature band, $T_{HY}$, that is directly proportional to the magnitude of the current $I_3$. In the preferred embodiments of the present invention, with currents $I_1$ equal to 10 microAmps, $I_2$ equal to 10 microAmps, $I_3$ equal to 60 microAmps, and a reference voltage equal to 1.2 volts, a hysteresis temperature $T_{HY}$ of 1° C. is realized.

Referring again to FIG. 3, the resistor $R_1$ and circuitry leading to the production of a logic signal on conductive trace 62 provides for discrimination of a single temperature threshold. In accordance with the present invention, a second of any number of successive temperature thresholds may be discriminated by the provision of the resistor $R_2$, ESD circuit 92 and FET 88. The gate of the FET 88 is again coupled to the reference volta $V_{REF}$ at node 52. A conductive trace 86 conducts a current $I_4$ through an FET 90 to the ground trace 38. The gate of the FET 90 is connected to the gate of the FET 56 to force the current $I_4$ to remain proportional to the current $I_1$ by a factor $K_4$. The input of an invertor 100 is connected to the conductive trace 86 and its output is connected through another invertor 104 and ESD circuit 106 to a conductive trace 30 connected to another external connector pin of the packaged integrated circuit 36. The output of the invertor 100 is also connected via conductive trace 102 to the gate of an FET 94 to control the conduction of a current $I_5$, related by a factor $k_5$ to the current $I_1$, via a conductive trace 96 and through an FET 98 to the ground trace 38. The FET 94 operates to provide hysteresis in the discrimination of the temperature threshold selected by the resistor $R_2$.

The accuracy of the present invention in discriminating temperature thresholds is within ±3% of the desired temperature using the internal temperature dependent resistor The P⁻ resistor has a worst case accuracy of ±0.6% after trim. The current mirror FETs have a worst case fabrication mismatch of less than ±1.5%. Finally, a setpoint resistor $R_1$ or $R_2$ can be chosen to have a worst case resistance of less than ±1.0%. Consequently, the present invention, with a worst case tolerance of ±3.1%, realizes a level of accuracy better than the ±5% or greater tolerance of conventional circuits.

FIG. 5 provides a detailed circuit diagram of the latch 22 used in accordance with a preferred embodiment of the present invention. The logic states at the output of the invertors 78, 100 are coupled via conductive traces, 80, 102 to the respective inputs of invertors 108, 110. The outputs of the invertors 108, 110 are coupled to the gates of series connected P− and N-channel FETs 112, 114, further connected between the +V voltage rail and the ground trace 38. Invertors 116, 118 are interconnected to latch the state of the series connection point between the FETs 112, 114. The output of the invertor 116 is coupled through an invertor 120 and then an invertor 122. The output of the invertor 122 is coupled through an ESD circuit 124 to an output conductive trace 128 connected to another connector pin of the packaged integrated circuit 36. An inverted version of the same signal is provided on the output conductive trace 130 from the output of the invertor 120 once coupled through another ESD circuit 126. The output conductive trace 130 may be brought out to a separate connector pin of the packaged circuit 36 or, in accordance with the present invention, both of the output conductive traces 128, 130 may be provided via respective bonding option pads to a single connector pin. In this manner, either the true or inverted latched output signal may be produced based on selection of a post-fabrication bonding option.

Thus, a precision resistor comparator, suitable for monolithic fabrication has been disclosed. The comparator includes a temperature sensitive resistive element suitable for on-chip fabrication to allow operation as a solid state thermostat, or, more generally, a temperature threshold sensing logic device.

Naturally, many modifications and variations of the present invention are possible in light of the above description of the preferred embodiments. Such modifications may include the use of bipolar rather than FET transistors, alternate doping impurities and corresponding doping densities. In addition, temperature dependent resistive elements may be substituted for the temperature threshold discrimination resistors, $R_1$ and $R_2$, while a temperature insensitive resistor is used to establish the reference current. It is therefore to be understood that, within the scope of the appended claims, the present invention may be practiced otherwise than is specifically described

I claim:

1. A resistor comparator comprising:
   a) a monolithic substrate;
   b) first means, at least partially formed in said monolithic substrate, for providing a resistance value that is dependent on the temperature of said first means;
   c) second means, at least partially formed in said monolithic substrate, for providing a second resistance value that is independent of the temperature of said second means; and
   d) generating means, formed in said monolithic substrate and coupled to said first and second means,
   . for providing a signal whose value corresponds to the difference in resistance value between said first and second means;
   wherein said generating means comprises:
   a) means for providing a reference voltage;
   b) means for conducting respective currents having a predetermined relation through said first and second means, said conducting means providing an output voltage proportional to the current level through said second means; and
   c) level shifter means, coupled between said first and second means and said conducting means, for constraining said output voltage to within a predetermined voltage range inclusive of said reference voltage; and
   d) output means, responsive to said output voltage, for providing said signal.

2. The resistor comparator of claim 1 wherein said first means comprises a P-type integrated resistor formed in said substrate and having a temperature coefficient within the range of about 5 percent per degree Centigrade to 0.05 percent per degree Centigrade.

3. A circuit comprising:
   a) a substrate of a semiconductor material;
   b) first means, formed in said substrate, for receiving a first voltage level;
   c) second means, formed in said substrate, for receiving a second voltage level;
   d) relating means, formed in said substrate, for establishing a first predetermined relationship between said first and second voltage levels by using proportional currents through said first and second means, said relating means being coupled to said first and second means, said relating means including limiter means, coupled to said second means, for providing an output voltage level within a predetermined voltage range, said output voltage level having a second predetermined relationship to the difference between said first and second voltage levels;

e) means, formed in said substrate and responsive to said output voltage level, for selectively altering said first predetermined relationship;

f) third means, formed in said substrate for receiving a third voltage level, wherein said relating means is further coupled to said third means for establishing a third predetermined relationship between said first and third voltage levels, said limiter means being coupled to said third means for providing another output voltage level having a fourth predetermined relationship to the difference between said first and third voltage levels; and means, formed in said substrate and responsive to said another output voltage level, for selectively altering said third predetermined relationship.

4. The circuit of claim 3 further comprising logic means for combining said output voltage level and said another output voltage level to provide an output voltage level that transitions to a first predetermined voltage level in response to said output voltage level crossing a first predetermined voltage threshold and to a second predetermined voltage level in response to said another voltage level crossing a second predetermined voltage threshold.

5. The circuit of claim 3, or 4 wherein said first means comprises sensor means for providing said first voltage level and wherein said sensor means is formed in said substrate as an integrated resistor.

6. The circuit of claim 5 wherein said integrated resistor has a temperature coefficient of between about 5 percent per degree Centigrade to 0.05 percent per degree Centigrade.

7. An integrated circuit provided on a single semiconductor substrate for comparing the resistance value of a resistor to that of another resistor, said circuit comprising:

a) current mirror means for establishing a first predetermined current relationship between first and second currents conducted through first and second current paths;

b) limiter means, coupled to said current mirror means, for constraining the voltage potential of said first and second current paths to within a predetermined voltage range;

c) first coupling means for coupling a reference resistor to said limiter means, the current through said first coupling means establishing the level of current conducted through said first current path;

d) second coupling means for coupling a first comparison resistor to said limiter means to provide current for conduction through said second current path; and e) first output means, coupled to said second current path, for providing a first output signal corresponding to the voltage potential of said second current path.

8. The circuit of claim 7 wherein said output means comprises:

a) means, coupled to said second current path, for providing a third current path, the current through said third current path having a second predetermined current relationship with said first current; and b) means, coupled to said third current path, for selectively blocking the conduction of said third current, said selectively blocking means being responsive to said first output signal.

9. The circuit of claim 8 further comprising:

a) means, coupled to said limiter means, for providing a fourth current path, the current through said fourth current path having a third predetermined current relationship with said first current;

b) third coupling means for coupling a second comparison resistor to said limiter means to provide current for conduction through said third current path;

c) second output means, coupled to said fourth current path, for providing a second output signal corresponding to the voltage potential of said fourth current path;

d) means, coupled to said fourth current path, for providing a fifth current path, the current through said fourth current path having a fourth predetermined current relationship with said first current; and e) means, coupled to said fifth current path, for selectively blocking the conduction of said fifth current, said selectively blocking means being responsive to said second output signal.

10. The circuit of claim 9 further comprising logic means, responsive to said first and second output signals, for providing a multi-state output signal, said logic means providing a first state output signal when said first output signal crosses a first voltage threshold and a second state output signal when said second output signal crosses a second voltage threshold.

11. The circuit of claim 7, 8, 9, or 10 wherein said reference resistor is provided as an integrated resistor provided on said single semiconductor substrate with said circuit.

12. The circuit of claim 11 wherein said integrated resistor has a temperature coefficient of between about 5 percent per degree Centigrade to 0.05 percent per degree Centigrade.

13. A resistor comparator comprising:

a) a monolithic substrate;

b) first means, at least partially formed in said monolithic substrate, fir providing a resistance value that is dependent on the temperature of said first means;

c) second means, at least partially formed in said monolithic substrate, for providing a second resistance value that is independent of the temperature of said second means; and d) generating means, formed in said monolithic substrate and coupled to said first and second means, for providing a signal whose value corresponds to the difference in resistance value between said first and second means, wherein said generating means comprises:

i) means for providing a reference voltage;

ii) means for conducting respective currents having a predetermined relation through said first and second means, said conducting means providing an output voltage proportional to the current level through said second means; and iii) level shifter means, coupled between said first and second means and said conducting means, for constraining said output voltage to within a predetermined voltage range inclusive of said reference voltage; and iv) output means, responsive to said output voltage, for providing said signal.

* * * * *